Feb. 11, 1930. R. G. RICHARDSON 1,746,794
SPEED RESPONSIVE DEVICE
Filed Oct. 28, 1925
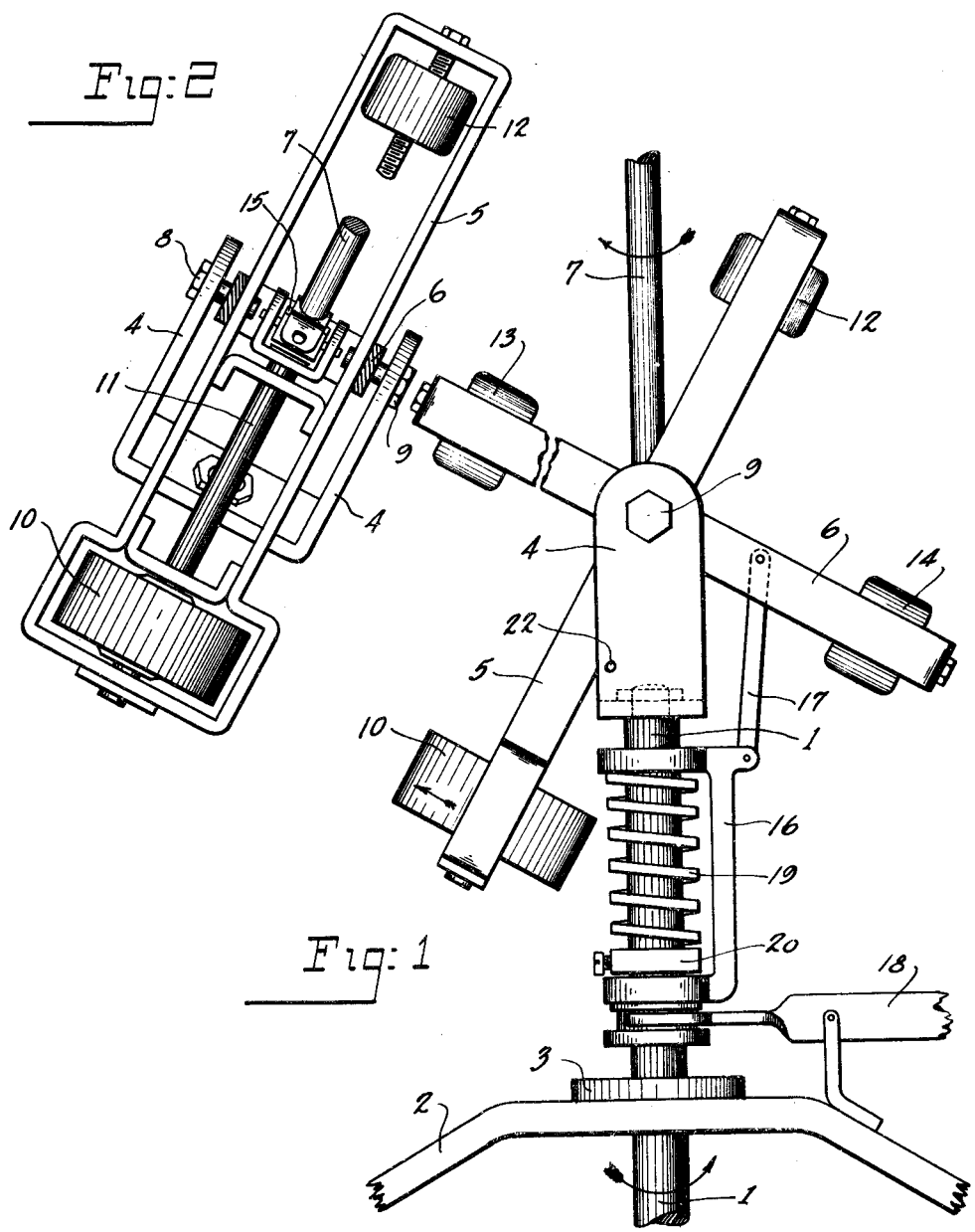
Inventor —
Rodney G. Richardson Patented Feb. 11, 1930

1,746,794

UNITED STATES PATENT OFFICE

RODNEY G. RICHARDSON, OF CHICAGO, ILLINOIS

SPEED-RESPONSIVE DEVICE

Application filed October 28, 1925. Serial No. 65,265.

My invention relates in general to speed responsive devices, but more particularly to devices of this character which depend for their operation upon the generation of a gyroscopic couple. The present invention may be considered as an improvement on or modification of the speed responsive device shown and described in my prior Patent No. 1,653,660, granted Dec. 27, 1927.

The principal object of the invention is a new and improved design and arrangement of parts whereby one or more sets of gears usually required to rotate the gyro wheel are eliminated, thus doing away with a possible objection to existing devices of this kind. Other objects and advantages will be pointed out in the course of the ensuing description.

Referring to the drawing, Fig. 1 is a side elevation of a governor embodying the invention; while Fig. 2 is a top view of the frame 5 shown in Fig. 1. Fig. 2 is partly in section and certain parts clearly depicted in Fig. 1 are omitted.

The shaft 1, of which only the upper end is shown, is rotatably supported in a frame 2 by means of a bearing 3. This shaft supports the various parts and is therefore provided with a suitable thrust bearing at the lower end. Here also may be provided gears or other means by which the shaft is connected to the engine or other prime mover. These arrangements do not form part of the invention and hence are not shown in the drawing.

To the upper end of shaft 1 is attached a forked member 4, which supports the gyro frame. This latter comprises a rectangular frame member 5 and a similar frame member 6, the two being positioned at right angles to each other and rigidly secured together by welding or any suitable means. The complete frame is pivotally supported within the fork 4 at 8 and 9. The rotor or gyro wheel 10 is mounted on a shaft 11, which is provided with suitable bearings on the frame member 5, as illustrated in Fig. 2. At the upper end of frame member 5 is a weight 12, and similar weights 13 and 14 are provided at opposite ends of frame member 6. It will be observed that the complete frame is symmetrical with respect to the axis 8—9, and it may be pointed out that by adjusting weights 12, 13, and 14 an approximate balance is easily obtained so that the action of gravity and centrifugal forces are rendered negligible. However, any desired degree of unbalance may be had also, so that either or both these forces may be made use of to modify the effect of the gyroscopic couples.

The weight 12 alone would suffice to balance the frame 5 against the attraction of gravity, but weights 13 and 14 are necessary in order to secure a balance against centrifugal forces generated by rotation of the frame about axis 1, which, if unopposed, would cause frame 12 to tend to assume a position at right angles to shaft 1. The addition of the frame member 6 and weights 13 and 14 makes it possible to balance the device against centrifugal forces also, because the centrifugal forces tending to position frame 6 at right angles to shaft 1 oppose the similar forces acting on frame 5. The weights may be adjusted by turning them backward or forward on their threaded supports, as indicated, in the case of weight 12, by Fig. 2.

In order to rotate the gyro shaft 11, a shaft 7 is provided. Shaft 7 is positioned in alignment with shaft 1, where it is supported by suitable bearings (not shown), and is also connected to the prime mover by gears or other suitable means. The direction of rotation of shaft 7, however, is opposite to the direction of rotation of shaft 1. The two shafts 7 and 11 are coupled together by means of a flexible coupling, or universal joint, as indicated at 15.

It will be understood that in the operation of the device the gyro frame will rotate to a limited extent about the axis 8—9. This movement is communicated to the control or indicating apparatus by means of a link 17, a double sleeve 16, sliding on shaft 1, and a forked lever 18. Downward movement of the sleeve 16 is opposed by spring 19, which is tensioned between the upper part of the sleeve and a collar 20, the latter being secured to shaft 1. When the device is at rest spring 19 is under tension and holds the frame in the position shown in Fig. 1, with frame member 5 resting on cross rod 22.

The operation is as follows: Assuming that the two shafts 1 and 7 are connected to the prime mover as described, so as to rotate in the directions shown by the arrows, when the prime mover is started (this may be a steam engine, for example), the two shafts begin to turn, and shaft 7 rotates the gyro shaft 11 and wheel 10, while shaft 1 rotates the complete frame. These simultaneous rotations about non-coincident axes generate a gyroscopic couple which tends to rotate the frame in a clock-wise direction about axis 8—9. The tendency is for shaft 11 to align itself with shaft 1 in such a position that its direction of rotation will be the same. As the speed increases, the gyroscopic couple increases, until eventually a point is reached where the tension of spring 19 is overcome somewhat and lever 18 begins to shut off the supply of steam. The point at which this takes place is of course determined by the tension spring 19, which can be adjusted by shifting the collar 20 up or down on the shaft 1. This is so when the governor itself is considered, but it will be understood that adjustments may be made between lever 18 and the valve gear so as to delay or hasten the effect of the lever's movement, all according to usual practice.

I have chosen a very simple embodiment of the invention and have illustrated the invention in a more or less diagrammatic or conventional manner in order to more easily explain the principles of operation, from which it will be clear that I have devised a simple and effective arrangement of parts for a gyroscopic speed responsive device whereby the gyro shaft can be rotated without the use of any gears in the device itself.

It is to be understood that in the claims appended hereto wherever the words "flexible coupling," "universal joint," or similar expressions are used, these expressions are intended to mean a universal joint similar to what is shown in the drawings, or a fair equivalent thereof, such as a section of flexible shaft, but they are not intended to include systems of gearing such, for example, as is shown in my prior application referred to herein.

Various other modifications are possible without departing from the spirit of the invention, and I do not, therefore, wish to be held to the precise form of the invention shown herein, but desire to include and have protected by Letters Patent all forms of my invention that come within the scope of the appended claims.

What I claim is:

1. In a speed responsive device, two shafts in axial alignment and rotating in opposite directions, a frame pivotally supported on one shaft, a gyro shaft supported in bearings on said frame, and a flexible coupling connecting the said gyro shaft with the other of said first mentioned shafts, said coupling comprising an interposed member pivoted to both shafts.

2. In a gyroscopic speed responsive device, a rotatable articulate shaft comprising two jointed sections always rotating in the same direction, a gyro wheel supported on one section, and means for rotating said gyro section about an axis coincident with the axis of the other section.

3. In a speed responsive device, means for generating a gyroscopic couple, said means including a gyro and supporting frame, and means for balancing the said frame against gravity and against centrifugal forces in any position which it assumes during operation.

4. In a speed responsive device, a driven shaft, a gyro shaft, a second driven shaft substantially in line with said first shaft, means supporting the gyro shaft on said first shaft at an acute angle, and a universal joint connecting the gyro shaft with the second driven shaft, whereby the gyro shaft is rotated in the same direction as the second shaft.

5. In a speed responsive device, a main shaft, a gyro shaft, a frame member supporting said gyro shaft on said main shaft so that the two shafts are relatively movable but the axes of the shafts are normally separated by an angle of less than 45 degrees, and a third shaft having the same axis as said main shaft and arranged to drive the gyro shaft by means of a flexible coupling in the same direction as said third shaft.

6. In a speed responsive device, two rotatable shafts in axial alignment and extending in opposite directions from a point on their common axis, a gyro supported on one shaft in such a position that the axis of rotation of the gyro intersects the said point on the common axis, and a coupling device connecting said gyro with the other shaft.

7. In a speed responsive device, two rotatable shafts in axial alignment, a gyro having its axis of rotation intersecting the axis of said first-mentioned shafts, means supporting said gyro on the first shaft so as to leave a space at the point where the said axes intersect, and a coupling device located at said intersection for connecting the second shaft with said gyro.

8. A speed responsive device comprising a gyroscope and means for rotating the same, means for revolving the axis of the gyroscope about an axis other than its axis of rotation thereby generating a force tending to turn the axis of the gyroscope about a third axis at right angles to the axis of rotation and the axis of revolution, means for balancing the revolving system so that the summation of the centrifugal forces tending to turn the system about said third axis due to the revolution of the system is zero regardless of the position of the system about said third axis, and a device controlled by the turning of the axis of the gyroscope about said third axis.

9. A speed responsive device comprising a system of weights, means for revolving said system about an axis, said system being rotatable about an axis at right angles to said first mentioned axis and being balanced so that the sum of the centrifugal forces tending to rotate said system about said second axis due to the revolving of the system about the first axis is (substantially) zero for any position of the system with respect to the second axis, said system including a gyro wheel and means for rotating the wheel about an axis at right angles with said second axis and non-coincidental with the first axis, whereby a force tending to turn said system about said second axis is produced, and a device actuating responsive to the turning of said system about the second mentioned axis.

10. A speed responsive device comprising a system of interconnected weights having their centers of gravity in a common plane and arranged so that the moment of inertia of the system about any line lying in said plane and passing through the center of gravity of the system is constant, said system being rotatable about an axis passing through the center of gravity of the system at right angles to said plane, one of said weights being a gyro wheel rotatable about an axis that lies in said plane and passes through the center of gravity of the system, means for revolving the system about an axis at right angles to said first mentioned axis whereby a force tending to turn the axis of the gyro about said first mentioned axis is produced, and a device actuated an amount which is a function of said force.

11. A speed responsive device comprising a system of three or more arms arranged so that their centers of gravity lie in a common plane, said system being pivoted to turn about an axis passing through the center of gravity of the system at right angles to said plane, means for revolving said system about an axis at right agles to said first mentioned axis, one of said arms including a gyro wheel mounted to rotate about an axis at right angles to said first mentioned axis and non-coincidental with said second mentioned axis, thereby generating a force tending to turn said system about said first mentioned axis, and a device actuated responsive to the turning of said system about said first mentioned axis.

12. In a speed responsive device, two rotatable shafts in axial alignment with their ends close together, a third shaft connected to the end of the first of said shafts by a universal joint and extending past the end of the second of said shafts making an acute angle therewith, a rotor mounted in said third shaft, means for causing the second shaft to rotate the third shaft and rotor about the first shaft as an axis, thereby generating a couple tending to change the said angle, and a device actuated by said third shaft in moving responsive to said couple.

Signed at Chicago, county of Cook, and State of Illinois, this 26th day of October, 1925.

RODNEY G. RICHARDSON.